United States Patent
Qiu et al.

(10) Patent No.: US 11,397,519 B2
(45) Date of Patent: Jul. 26, 2022

(54) INTERFACE CONTROLLER AND OVERLAY

(71) Applicant: Business Objects Software Ltd., Dublin (IE)

(72) Inventors: Xin Qiu, Vancouver (CA); James LLoyd, Vancouver (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/698,345

(22) Filed: Nov. 27, 2019

(65) Prior Publication Data
US 2021/0157476 A1    May 27, 2021

(51) Int. Cl.
| | |
|---|---|
| *G06F 3/0484* | (2013.01) |
| *G06F 3/04847* | (2022.01) |
| *G06F 3/04815* | (2022.01) |
| *G06F 40/143* | (2020.01) |
| *G06F 16/245* | (2019.01) |
| *G06F 9/451* | (2018.01) |

(52) U.S. Cl.
CPC ...... *G06F 3/04847* (2013.01); *G06F 3/04815* (2013.01); *G06F 9/451* (2018.02); *G06F 16/245* (2019.01); *G06F 40/143* (2020.01); *G06F 2203/04803* (2013.01)

(58) Field of Classification Search
CPC .... G06F 3/04847; G06F 9/451; G06F 16/245; G06F 40/143; G06F 3/04815; G06F 2203/04803; G06F 40/166; G06F 40/289
See application file for complete search history.

(56) References Cited

U.S. PATENT DOCUMENTS

| | | | | |
|---|---|---|---|---|
| 5,859,623 | A * | 1/1999 | Meyn | G06F 3/14 715/730 |
| 6,925,608 | B1 * | 8/2005 | Neale | G06F 16/332 715/763 |
| 6,988,241 | B1 * | 1/2006 | Guttman | G06F 40/18 715/220 |
| 7,587,411 | B2 * | 9/2009 | De Vorchik | G06F 16/168 |
| 7,649,451 | B2 * | 1/2010 | Yoshida | H04N 1/00204 340/525 |

(Continued)

OTHER PUBLICATIONS

Whiteaker et al. (see "http://his.cuahsi.org/documents/HydroExcel_1_1_1_Software_Manual.pdf"; pub date: May 2009; downloaded on Aug. 28, 2020) (Year: 2009).*

*Primary Examiner* — Pei Yon Weng
(74) *Attorney, Agent, or Firm* — Fountainhead Law Group P.C.

(57) ABSTRACT

The present disclosure pertains to user interface controllers and overlays. A portion of the user interface may be covered by an overlay, which may be generated for certain states of the user interface. A user input may set a first selection of control elements of an interface controller in a user interface. In the user interface, particular selections of the control elements may be configured to cause corresponding sets of potential interface elements to be displayed in a portion of the user interface. It may be determined that the first selection of the control elements is configured to cause none of the potential interface elements to be displayed in the portion of the user interface. The overlay may be generated based on a display-level of the interface controller in the user interface, where the overlay covers portions of the user interface while not covering the interface controller.

20 Claims, 6 Drawing Sheets

(56) References Cited

U.S. PATENT DOCUMENTS

| | | | | |
|---|---|---|---|---|
| 7,725,549 B2* | 5/2010 | Bauchot | G06Q 10/107 | 709/206 |
| 7,814,437 B2* | 10/2010 | Marchev | G06F 9/451 | 715/853 |
| 7,941,429 B2* | 5/2011 | Krovitz | G06F 16/904 | 707/723 |
| 8,181,119 B1* | 5/2012 | Ording | G06F 9/451 | 715/810 |
| 8,271,376 B2* | 9/2012 | Harris | G06Q 20/10 | 705/37 |
| 8,392,823 B1* | 3/2013 | Schneider | G06F 16/951 | 715/234 |
| 8,417,728 B1* | 4/2013 | Anders | G06F 8/38 | 707/793 |
| 8,438,467 B2* | 5/2013 | Blain | G01V 99/005 | 715/226 |
| 8,489,641 B1* | 7/2013 | Seefeld | G06F 16/9537 | 707/792 |
| 8,489,990 B2* | 7/2013 | Radloff | G11B 27/105 | 715/721 |
| 8,532,962 B2* | 9/2013 | Zhang | G06F 30/13 | 703/1 |
| 8,799,829 B2* | 8/2014 | Grosz | G06Q 10/101 | 715/866 |
| 8,887,044 B1* | 11/2014 | Goodspeed | G06F 3/0483 | 715/703 |
| 8,972,434 B2* | 3/2015 | English | G06Q 30/0603 | 707/765 |
| 9,021,371 B2* | 4/2015 | Mock | G06Q 10/103 | 348/14.03 |
| 9,098,829 B2* | 8/2015 | Koren | G06F 11/3438 | |
| 9,134,789 B2* | 9/2015 | Cotlarciuc | G06F 3/04842 | |
| 9,223,483 B2* | 12/2015 | Thorsander | G06F 3/04842 | |
| 9,298,943 B2* | 3/2016 | Johnson | G06F 21/16 | |
| 9,420,121 B2* | 8/2016 | Grosz | G06F 16/51 | |
| 9,460,059 B2* | 10/2016 | Sharma | G06F 40/14 | |
| 9,471,625 B2* | 10/2016 | Jones | G06F 16/248 | |
| 9,477,382 B2* | 10/2016 | Hicks | G06F 3/0485 | |
| 9,588,646 B2* | 3/2017 | Cassistat | G06F 3/04842 | |
| 9,600,822 B2* | 3/2017 | Pyle | G06Q 30/02 | |
| 9,685,140 B1* | 6/2017 | Wilson | G09G 5/14 | |
| 9,774,897 B2* | 9/2017 | Ellis | H04N 7/163 | |
| 9,852,114 B2* | 12/2017 | Wang | G06F 40/106 | |
| 9,881,339 B2* | 1/2018 | Mun | G06Q 40/06 | |
| 9,934,320 B2* | 4/2018 | Cordasco | G06F 16/9574 | |
| 9,965,451 B2* | 5/2018 | Zhou | G06F 40/103 | |
| 10,474,735 B2* | 11/2019 | DeLoach | G06F 40/106 | |
| 2002/0025085 A1* | 2/2002 | Gustafson | H04N 1/3871 | 382/311 |
| 2004/0216036 A1* | 10/2004 | Chu | G06F 3/04845 | 715/202 |
| 2005/0131760 A1* | 6/2005 | Manning | G06Q 30/0281 | 705/346 |
| 2005/0223337 A1* | 10/2005 | Wheeler | G06T 19/00 | 715/806 |
| 2005/0240428 A1* | 10/2005 | Gabrick | G06Q 10/10 | 705/310 |
| 2005/0246331 A1* | 11/2005 | De Vorchik | G06F 16/192 | |
| 2006/0149777 A1* | 7/2006 | Marchev | G06F 9/451 | |
| 2006/0267995 A1* | 11/2006 | Radloff | H04N 21/4312 | 345/530 |
| 2006/0277482 A1* | 12/2006 | Hoffman | G06F 40/169 | 715/764 |
| 2008/0040320 A1* | 2/2008 | Dettinger | G06F 16/2452 | |
| 2008/0059954 A1* | 3/2008 | Martin | G06F 11/261 | 717/134 |
| 2008/0301095 A1* | 12/2008 | Zhu | G06F 16/951 | |
| 2009/0019031 A1* | 1/2009 | Krovitz | G06F 16/54 | |
| 2009/0150343 A1* | 6/2009 | English | G06F 16/9535 | |
| 2010/0131879 A1* | 5/2010 | Blain | G06F 30/20 | 715/765 |
| 2011/0078594 A1* | 3/2011 | Guertler | G06F 3/0482 | 715/763 |
| 2011/0153279 A1* | 6/2011 | Zhang | G06F 30/00 | 703/1 |
| 2011/0179364 A1* | 7/2011 | Morris | G06F 3/0484 | 715/764 |
| 2011/0231777 A1* | 9/2011 | Koren | G06F 3/0484 | 715/743 |
| 2011/0258240 A1* | 10/2011 | LeFever | G06F 16/30 | 707/812 |
| 2011/0307810 A1* | 12/2011 | Hilerio | G06F 8/61 | 715/760 |
| 2012/0030566 A1* | 2/2012 | Victor | G06F 3/04883 | 715/702 |
| 2012/0047061 A1* | 2/2012 | Harris | G06Q 40/04 | 705/37 |
| 2012/0179692 A1* | 7/2012 | Hsiao | G06F 16/34 | 707/748 |
| 2012/0284609 A1* | 11/2012 | Marmor | H04L 67/28 | 715/234 |
| 2013/0007603 A1* | 1/2013 | Dougherty | G06F 40/114 | 715/251 |
| 2013/0088495 A1* | 4/2013 | Bech | G06T 13/00 | 345/467 |
| 2013/0091417 A1* | 4/2013 | Cordasco | G06F 16/986 | 715/234 |
| 2013/0132375 A1* | 5/2013 | Jones | G06F 16/2425 | 707/722 |
| 2013/0198190 A1* | 8/2013 | Cassistat | G06F 3/0482 | 707/737 |
| 2013/0227483 A1* | 8/2013 | Thorsander | G06F 3/0482 | 715/821 |
| 2013/0318275 A1* | 11/2013 | Dalal | G06F 13/1652 | 710/306 |
| 2014/0000438 A1* | 1/2014 | Feis | G10G 1/00 | 84/453 |
| 2014/0096020 A1* | 4/2014 | Grosz | G06Q 30/0601 | 715/738 |
| 2014/0143652 A1* | 5/2014 | DeLoach | G06F 40/143 | 715/234 |
| 2014/0143806 A1* | 5/2014 | Steinberg | G11B 27/034 | 725/34 |
| 2014/0173482 A1* | 6/2014 | Hicks | G06F 3/04883 | 715/769 |
| 2014/0195921 A1* | 7/2014 | Grosz | G06Q 30/0601 | 715/738 |
| 2014/0215339 A1* | 7/2014 | Klein | G06F 3/0416 | 715/727 |
| 2014/0245126 A1* | 8/2014 | Sharma | G06F 40/14 | 715/234 |
| 2014/0250370 A1* | 9/2014 | Woodard | H04L 67/2823 | 715/236 |
| 2014/0258894 A1* | 9/2014 | Brown | G06F 8/71 | 715/762 |
| 2014/0289650 A1* | 9/2014 | Cotlarciuc | G06F 3/0481 | 715/760 |
| 2014/0304681 A1* | 10/2014 | Jaramillo | G06F 8/34 | 717/107 |
| 2015/0019549 A1* | 1/2015 | Johnson | G06F 3/048 | 707/736 |
| 2015/0073922 A1* | 3/2015 | Epperson | G06Q 30/0277 | 705/14.73 |
| 2015/0095822 A1* | 4/2015 | Feis | G06F 3/04842 | 715/765 |
| 2015/0242651 A1* | 8/2015 | Loader | G06F 3/0488 | 726/27 |
| 2015/0268838 A1* | 9/2015 | Wang | H04M 1/72583 | 715/763 |
| 2015/0317057 A1* | 11/2015 | Choi | H04L 67/38 | 715/757 |
| 2015/0370763 A1* | 12/2015 | Wang | G06F 40/143 | 715/235 |
| 2016/0070811 A9* | 3/2016 | Cordasco | G06F 16/9574 | 715/234 |
| 2016/0092081 A1* | 3/2016 | Reichle | G06F 3/0481 | 715/765 |
| 2016/0110812 A1* | 4/2016 | Mun | G06Q 40/06 | 705/36 R |

(56) References Cited

U.S. PATENT DOCUMENTS

| | | | |
|---|---|---|---|
| 2016/0117059 A1* | 4/2016 | Ken | G06Q 10/0631 |
| | | | 715/738 |
| 2016/0224532 A1* | 8/2016 | Miller | G06F 16/22 |
| 2016/0295261 A1* | 10/2016 | Ellis | H04N 21/4438 |
| 2016/0364369 A1* | 12/2016 | Zhou | G06F 40/14 |
| 2017/0098154 A1* | 4/2017 | Glendenning | G06F 16/9024 |
| 2017/0109002 A1* | 4/2017 | Ghanekar | G06F 16/9535 |
| 2017/0166056 A1* | 6/2017 | Buttolo | B60K 37/06 |
| 2018/0082451 A1* | 3/2018 | Dey | G06F 3/011 |
| 2018/0157467 A1* | 6/2018 | Stachura | G06F 8/34 |
| 2018/0174289 A1* | 6/2018 | Fukushima | G06T 7/90 |
| 2018/0275846 A1* | 9/2018 | Perret | G06F 16/245 |
| 2019/0155804 A1* | 5/2019 | Miller | G06F 16/23 |
| 2019/0369699 A1* | 12/2019 | Pathak | G06F 1/3206 |
| 2019/0377760 A1* | 12/2019 | Cho | G06F 16/90328 |
| 2020/0287992 A1* | 9/2020 | Berg | H04L 67/36 |

\* cited by examiner

INTERFACE CONTROLLER AND OVERLAY

BACKGROUND

The present disclosure relates to computing and data processing and in particular to user interface controllers and interface overlays.

Certain software applications enable users to customize the information shown in the user interface. The interface may be customized using an interface controller having control elements that can be selected to show corresponding interface elements in the user interface. However, customization of the user interface may lead to a poor user experience and inefficient use of computing resources in certain situations. For example, an error message may be shown if the customization of the user interface is set to an indeterminate state. In another example, the customization may cause too many interface elements of the user interface to be displayed or updated at the same time. These situations resulting in a poor user experience may be especially disruptive when the user is presenting the interface to others.

The present disclosure addresses these issue and others, as further described below.

SUMMARY

The present disclosure provides a computer-implemented method. The method includes determining a user input setting a first selection of control elements of an interface controller in a user interface. In the user interface, particular selections of the control elements are configured to cause corresponding sets of potential interface elements to be displayed in a portion of the user interface. The method further includes determining that the first selection of the control elements is configured to cause none of the potential interface elements to be displayed in the portion of the user interface. The method further includes generating an overlay based on a display-level of the interface controller in the user interface.

Another embodiment of the present disclosure provides a non-transitory machine-readable medium storing a program. The program is executable by at least one processing unit of a device. The program includes sets of instructions for determining a user input setting a first selection of control elements of an interface controller in a user interface. In the user interface, particular selections of the control elements are configured to cause corresponding sets of potential interface elements to be displayed in a portion of the user interface. The program also includes sets of instructions for determining that the first selection of the control elements is configured to cause none of the potential interface elements to be displayed in the portion of the user interface. The program also includes sets of instructions for generating an overlay based on a display-level of the interface controller in the user interface.

Another embodiment of the present disclosure provides a computer system. The computer system includes one or more processors and memory. The computer system also includes computer program code including instructions that are executable on the one or more processors. The computer program code is configured to determine a user input setting a first selection of control elements of an interface controller in a user interface. In the user interface, particular selections of the control elements are configured to cause corresponding sets of potential interface elements to be displayed in a portion of the user interface. The computer program code is also configured to determine that the first selection of the control elements is configured to cause none of the potential interface elements to be displayed in the portion of the user interface. The computer program code is also configured to generate an overlay based on a display-level of the interface controller in the user interface.

The following detailed description and accompanying drawings provide a better understanding of the nature and advantages of the present disclosure.

DETAILED DESCRIPTION

Figure 1:
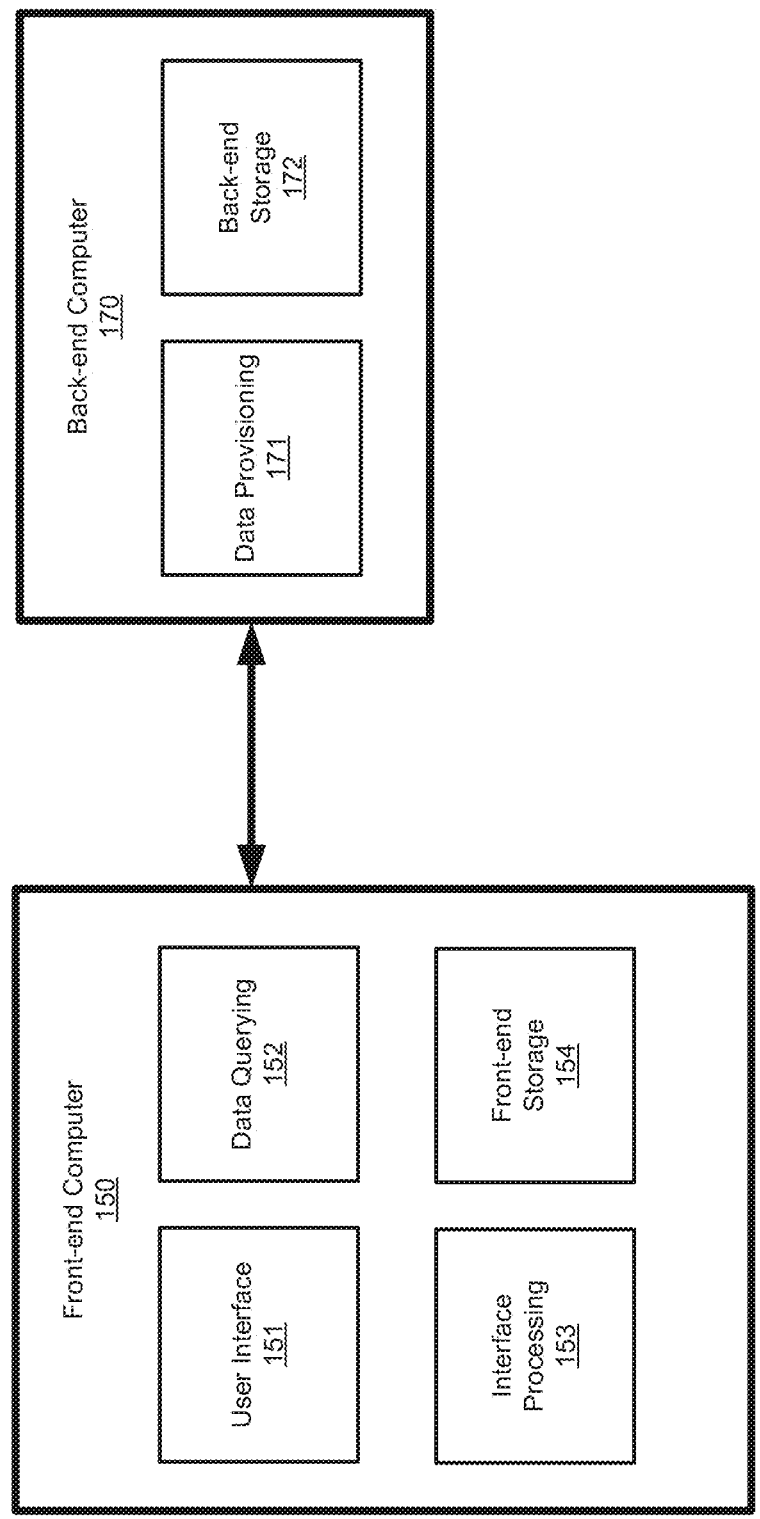
FIG. 1 shows a diagram of a computer system including a front-end computer and a back-end computer, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

As mentioned above, certain software applications enable users to customize the information shown in the user interface. The interface may be customized using an interface controller having control elements that can be selected to show corresponding interface elements in the user interface. However, customization of the user interface may lead to a poor user experience and inefficient use of computing resources in certain situations.

One example of a poor user experience is caused by error messages shown if the customization causes the user interface to be set to an indeterminate state. For example, a software application may be used to visualization data and it may enable a user to customize the information used to create various charts and graphs. However, if the user does not have any information selected (e.g., via a list of checkboxes), the graph or chart may enter an indeterminate state—the graph is empty because there is no information selected to graph. This situation may occur frequently because when a user wants to select a particular set of checkboxes they may first deselect an "all" checkbox, which unchecks all of the other checkboxes and puts the interface into an indeterminate state (e.g., all of the information is removed from the graphs), before selecting the particular set of checkboxes. Since this process may be a common workflow for users, constant error messages indicating the indeterminate state may lead to a poor user experience.

Another example of a poor user experience may arise when selecting or deselecting an "all" checkbox for customizing the user interface. Referring to the example software application for visualization data in charts and graphs discussed above, each customization may cause a query to be sent to a remote system and an update to the interface when the response to the query is received. Selecting or deselecting the "all" checkbox may cause many interface elements of the user interface to be displayed or updated in a short period of time, causing the elements displayed in the interface to jitter, jump around, or flicker, which may be distracting to the user. This issue may be especially problematic due to network latency causing updates to happen at different times.

As mentioned above, these examples of a poor user experience may be especially disruptive if the user is using the software to present information to others. In addition, the workflow of selecting "all," deselecting "all," and then selecting a particular set of checkboxes wastes computing and networking resources by sending queries for all of the data when the user intends to customize the interface to show to a particular set of information, not all of the information.

The improved user interface described herein addresses these issues by generating an overlay that covers certain user interface elements while leaving the interface controller uncovered. The overlay may be generated in response to determining or detecting that the selection of interface control elements (e.g., checkboxes) would result in the user interface entering into an indeterminate state (e.g., none of the potential user interface elements are selected to be displayed). The overlay may be a transparent gray box appearing below the interface controller, for example. The overlay may be any appropriate color. In embodiments where the user interface is a webpage, the overlay may include one or more Hypertext Markup Language (HTML) "div" containers (e.g., <div> tag), for example. A div tag may define a division or a section in an HTML document and may encapsulate other page elements.

The overlay may be other colors or a combination of colors. The overlay may also include digital image processing to the covered interface elements (e.g., blurring, distortions, mosaics, whirls, brightness adjustments, contrast adjustments, etc.). The interface controller may be highlighted in the user interface in comparison to the interface elements covered by the overlay, indicating to the user that they should select control elements in the interface controller in order to cause the overlay the be removed.

In addition to generating and displaying the overlay, the improved user interface may also prevent queries from being triggered such that requests to a remote server that would overwise be made based on the user's selection are not sent. Furthermore, the user interface elements covered by the overlay may not be updated until determining or detecting that the selection of interface control elements (e.g., checkboxes) would not result in the indeterminate state (e.g., at least one of the potential user interface elements are selected to be displayed). The user may also be prevented from interacting with user interface elements covered by the overlay (e.g., those elements may not trigger their typical functionality). As such, the portions of the user interface covered by the overlay may be "paused" until the user has made a selection to the interface controller of at least one of the potential interface elements to be displayed.

In some embodiments, certain menus or interface elements may also not be covered by the overlay (e.g., they may appear above the overlay) and the user may be able to interact with them. For example, a main menu for opening or closing parts of the software may not be covered by the overlay. in addition, other menus or popup windows for changing the selection of the interface controller may not be covered by the overlay.

This solution is advantageous as the overlay may visually indicate to the user that they should select control elements (e.g., checkboxes) in the non-overlayed interface controller in order to make at least one of the potential user interface elements be displayed, thereby leaving the indeterminate state. Thus, the overlay improves the user experience because it indicates to the user that there is an issue with the selection of control elements in the interface controller without presenting a disruptive error message. The user experience is also improved because interface elements covered by the overlay may be paused, preventing jittering or flickering of the interface elements when numerous elements are selected or deselected (e.g., when selecting or deselecting an "all" checkbox). Furthermore, computing and networking resources may be reduced since queries are not sent and updates to the user interface are not made while the overlay is being displayed and the interface is paused.

The improved interface overlay and pause mode may be implemented in any user interface where a user can make selections to customize the information or user interface elements to be displayed in the interface.

As further described below, the improved interface overlay and pause mode may be implemented in a front-end of a cloud application. The cloud application may be implemented by a web browser of the front-end computer, for example. The cloud application may query and receive data from a remote back-end computer over a network to be used for visualizing the data (e.g., in charts and graphs). The data at the back-end computer may be referred to as being "in the cloud." While cloud applications are described herein, the improved user interface may be implemented in any other software application using an interface controller.

FIG. 1 shows a diagram of a computer system including a front-end computer 150 and a back-end computer 170, according to an embodiment. The front-end computer 150 may be referred to as a "front-end computer" because it may provide a user interface visualizing data received from a database running on the "back-end computer." In many situations, the user may see and be aware of the front-end but not the back-end. The front-end computer 150 may be a desktop computer, laptop computer, user device, server computer, or a system of more than one computer, for example. The front-end computer 150 implements the improved user interface and overlay described herein.

The front-end computer 150 may include a user interface software module 151, an interface data querying software module 152, an interface processing software module 153, and a front-end storage software module 154. In some embodiments, the user interface 151, data querying 152, and interface processing 153 modules may be implemented by a web browser executed by the front-end computer 150.

Figure 2:
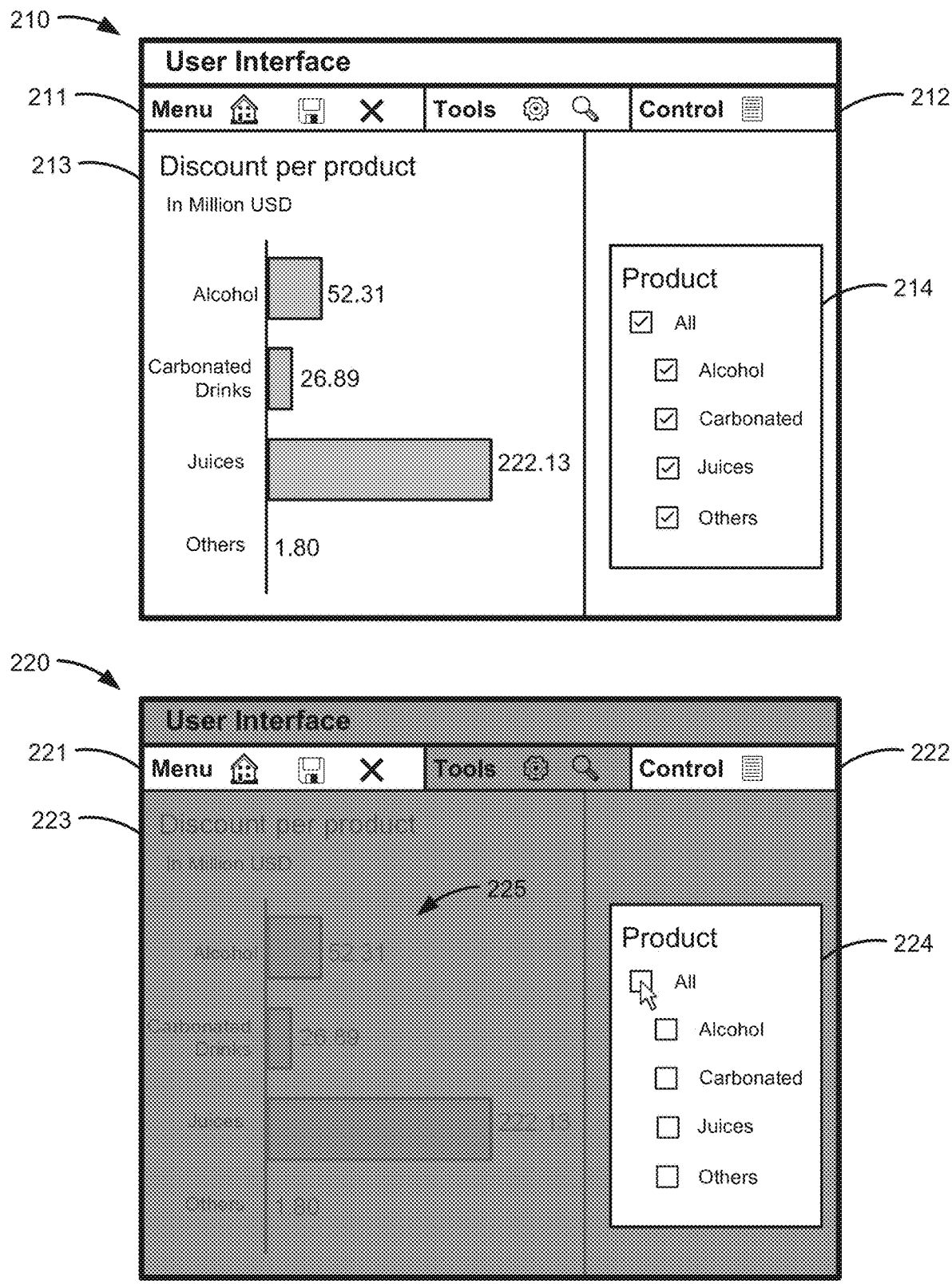
FIG. 2 shows exemplary user interfaces with an interface controller included in the page, according to an embodiment.
Figure 3:
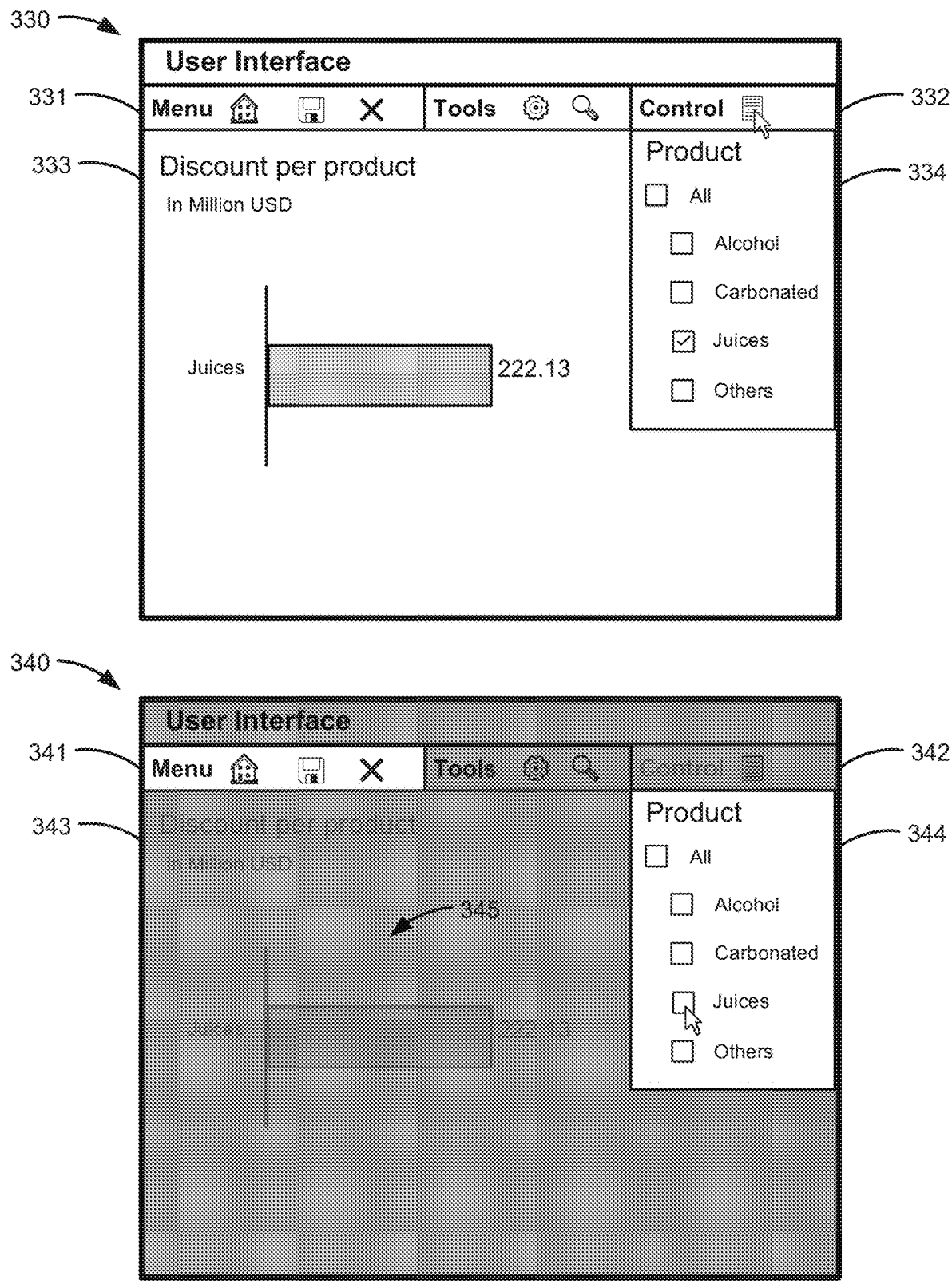
FIG. 3 shows exemplary user interfaces with an interface controller in a popup menu, according to an embodiment.

The user interface software module 151 may be configured to generate, render, and display a user interface. Example user interfaces that may be generated by the user interface software module 151 are shown in FIG. 2 and FIG. 3. The user interface may be displayed to the user via a display screen (not shown). For example, the user interface module 151 may be configured to generate and present an interface for interacting with visualization data, such as charts and/or graphs.

The data querying software module 152 may be configured to generate queries to send to the back-end computer 170. The queries may request data to be processed and visualized on the user interface. For example, as further described below with respect to FIG. 2 and FIG. 3, the data questing module 152 may send queries to the back-end server 170 to receiving information on a data model to be visualized as charts and graphs in the user interface.

The interface processing software module 153 may be configured to determine or detect changes to the user interface, generate the overlay, and prevent the user interface elements covered by the overlay from being interacted with, as further described below. For instance, the interface processing software module 153 may determine or detect that a selection of interface control elements (e.g., checkboxes) in an interface controller (e.g., list of check boxes) in the user interface would result in the user interface entering into an indeterminate state (e.g., none of a set of potential user interface elements are selected to be displayed). For example, interface configuration data (e.g., a data model) may be used to configure the user interface may be updated based on the user's interactions with the user interface (e.g., selection of check boxes). The interface configuration data or data model may be a JavaScript Object Notation (JSON) object, for example. The interface processing software module 153 may be configured to detect changes to the interface configuration data. For example, the user's interactions may trigger a function call and the interface processing module 153 can be configured to listen for that function call and review the interface configuration data in response. The user interface and interface overlay are further described below with respect to FIG. 2 and FIG. 3.

The front-end storage module 154 may be configured to store data to and retrieve data from a memory of the front-end computer 150 (not shown). The memory may be a system memory or a file system of the front-end computer 150, for example. The front-end storage module 154 may handle storage of interface configuration data and models and storage of query responses, for example.

The front-end computer 150 and the back-end computer 170 may be configured to communicate with each other over a network (not shown), such as the Internet or an intranet.

The back-end computer includes a data provisioning software module 171 and a back-end storage software module 172. The back-end computer 170 may be a server computer or a system of more than one computer, for example. The back-end computer 170 provides back-end processing for the cloud application provided by the front-end computer 150. The back-end computer 170 may be a server computer or a system of more than one computer, for example. The back-end computer 170 provides back-end processing for the cloud application provided by the front-end computer 150.

The data provisioning module 171 may be configured to receive and process the queries send by the data querying module 152 of the front-end computer 150. For example, the back-end computer may store a dataset formatted from source data (e.g., reports or logs) and a data model may be generated based on the data set. The data provisioning module 171 may provide information of the data model in response to queries from the front-end computer 150. The front-end computer 150 may use the information included in the query responses sent by the data provisioning module 171 to generate charts and/or graphs of the model generated based on the dataset, for example. The data model to be visualized as charts and graphs may include measures and dimensions. A "measure" may refer to a set of category of a numerical values in a model. For example, gross margin, sales price, quantity sold, revenue, and discount may be measures in the model. Values of the same measure can be summed together to get a cumulative value. A "dimension" may refer to a qualitative description of the data in the model. For example, category, location, product, manager, and store may be dimensions in the model. Visualization of such FIG. 2 and FIG. 3 show exemplary user interface for visualizing charts and graphs. As further described below, these user interfaces may implement the overlay and pause mode features described above.

FIG. 2 shows exemplary user interfaces with an interface controller included in the page, according to an embodiment. The user interfaces of FIG. 2 may be generated by a front-end computer based on information received from a back-end computer, as described herein. The user interfaces of FIG. 2 may be rendered by a web browser based on Hypertext Markup Language (HTML) files and Cascading Style Sheets (CSS) files, for example.

A first user interface 210 includes a menu bar 211, a toolbar, a control bar 212, a graph element 213 presenting a bar graph, and an interface controller 214. In this example, the interface controller 214 may be shown in the "page" next to the graph element 213 (e.g., in a web page). These elements of the user interface 210 and other similar elements may be referred to as "interface elements." An "interface element" may also refer to individual elements such as a text box, a symbol or icon, a particular bar in the bar graph, or any other individual element or group of elements in the user interface.

In this example, the bar graph shows "Discount per product" in millions of US dollars for Alcohol, Carbonated Drinks, Juices, and Others. The bar graph may be based on information received by querying a back-end computer, as described herein. The information included in the bar graph may be customizable by the user. As shown in FIG. 2, the bar graph can show a discount of "52.31" for "Alcohol," a discount of "26.89" for "Carbonated Drinks," a discount of "222.13" for "Juices," and a discount of "1.80" for "Others."

As shown in FIG. 2, the interface controller 214 can include control elements (e.g., check boxes) for selecting which "Products" to display in the user interface. The user can choose whether the display "Alcohol," "Carbonated Drinks," "Juices," and "Other drinks" in the bar graph by selecting the corresponding check boxes in the interface controller 214. For example, if the user unchecks the checkbox for "Juices," then the bar graph will not include the bar showing a discount of "222.13" for Juices. The interface controller also includes an "All" checkbox that, when checked, will check all of the other checkboxes (e.g., check the boxes for Alcohol, Carbonated Drinks, Juices, and Others).

In FIG. 2, all of the control elements of the interface controller 214 are checked. However, the user may want to remove the interface elements (e.g., bars in the bar graph) for Alcohol, Carbonated Drinks, and Others from the graph such that only the interface element for "Juice" is shown. To do this, the user may deselect "All" (e.g., un-check the "All" checkbox) and then select Juices (instead of separately unselecting the control elements for Alcohol, Carbonated Drinks, and Others). As discussed above, deselecting the "All" control element may cause the bar graph to go into an indeterminate state. That is, the bar graph may be configured to potentially display interface elements corresponding to Alcohol, Carbonated Drinks, Juices, and Others, but if none of these potential interface elements are selected in the interface controller 214, then the bar graph may have nothing to graph. That is, the selection of none of the control elements (e.g., none of the check boxes) is configured to cause none of the potential interface elements (e.g., none of the bar graphs) to be displayed in the graph element 213 portion of the user interface. As such, the bar graph may be referred to as being in an "indeterminate state."

As described herein, instead of presenting an error message to the user, the improved user interface may generate an interface overlay 225 covering certain portions of the user interface. The overlay 225 is shown in the second user interface 220. The second user interface 210 may correspond to the first user interface 210 after the user has deselected the "All" checkbox and the interface overlay 225 has been generated and displayed. In this example, the overlay 225 includes partially transparent gray shapes (e.g., rectangles or boxes) covering certain portions of the second user interface, besides the interface controller 224. Similar to the first user interface 210, the second user interface includes a menu bar 211, a toolbar, a control bar 212, a graph element 213 presenting a bar graph, and an interface controller 214. These elements of the second user interface 220 and other similar elements may be referred to as "interface elements." In this example, the overlay 225 may cover the toolbar and the graph element 213.

In embodiments where the user interface is a webpage, the overlay 225 may include one or more Hypertext Markup Language (HTML) "div" containers (e.g., <div> tag), for example. A div tag may define a division or a section in an HTML document and may encapsulate other page elements. In such embodiments, the position of the overlay 225 may be configured according to Cascading Style Sheets (CSS). A display-level (e.g., a CSS z-index) of the overlay 225 may be set based on a display level of the interface controller 224 such that the overlay is present underneath the interface controller 224 and the interface controller 224 is not obstructed or covered by the overlay 225.

The front-end computer providing the second user interface 220 may generate and display the overlay 225 in response to determining that the selection of the interface controller 224 (e.g., none of the checkboxes are checked) would put the graph element 223 into an indeterminate state. The front-end computer may further prevent rendering of any updates to the user interface based on the selection. For example, none of the bar graphs in the graph element 223 may be removed even though they are not selected in the interface controller 224.

In this example, the overlay 225 may not cover the interface controller 224, the menu bar 221, or the control bar 212. The menu bar 221 may not be covered by the overlay 225 so that the user may still return to a home screen, save their work, or exit the application, for example. The control bar 212 may not be covered by the overlay 225 because the control bar 212 may include an alternative interface controller for selecting interface elements to be shown in the user interface. An alternative interface controller is shown in FIG. 3.

FIG. 3 shows exemplary user interfaces with an interface controller in a popup menu, according to an embodiment. The user interfaces of FIG. 3 may be generated by a front-end computer based on information received from a back-end computer, as described herein. The user interfaces of FIG. 2 may be rendered by a web browser based on Hypertext Markup Language (HTML) files and Cascading Style Sheets (CSS) files, for example.

A third user interface 330 includes a menu bar 331, a toolbar, a control bar 332, a graph element 333 presenting a bar graph, and an interface controller 334. The third user interface 330 may be similar to the first user interface 210 except that only "Juices" is selected in the interface controller 334 and shown in the graph element 333 and the interface controller 334 is a popup menu presented by selecting an icon in the control bar 332 instead of being presented on the page (as in the first user interface 210).

In this example, the bar graph shows "Discount per product" in millions of US dollars for Juices as the control element corresponding to "Juices" is selected in the interface controller 334. As shown in FIG. 3, none of the control elements of the interface controller 214 are checked besides "Juices." That is, the control elements corresponding to "All," "Alcohol," "Carbonated Drinks," and "Others" are not checked (e.g., they are not selected).

In some cases, the user may want to remove the interface element (e.g., bars in the bar graph) for Juices and add the interface element for Carbonated Drinks. To do this, the user may deselect "Juices" (e.g., un-check the "Juice" checkbox) and then select the control element for "Carbonated" (instead of selecting "Carbonated" and then deselecting "Juices"). This action of deselecting "Juices" may cause none of the control elements to be selected, thereby causing the bar graph to go into an indeterminate state (e.g., none of the potential bars of the bar graph will be displayed).

As described herein, instead of presenting an error message to the user, the improved user interface may generate an interface overlay 345 covering certain portions of a fourth user interface 340. The fourth user interface 340 may correspond to the third user interface 330 after the user has deselected the "Juice" checkbox and the interface overlay 345 has been generated and displayed. In this example, the overlay 345 includes partially transparent gray shapes (e.g., rectangles or boxes) covering certain portions of the second user interface, besides the interface controller 344. Similar to the third user interface 330, the fourth user interface includes a menu bar 341, a toolbar, a control bar 342, a graph element 343 presenting a bar graph, and an interface controller 344.

In embodiments where the user interface is a webpage, the overlay 345 may include one or more Hypertext Markup Language (HTML) "div" containers (e.g., <div> tag), for example. A div tag may define a division or a section in an HTML document and may encapsulate other page elements. In such embodiments, the position of the overlay 345 may be configured according to Cascading Style Sheets (CSS). A display-level (e.g., a CSS z-index) of the overlay 345 may be set based on a display level of the interface controller 344 such that the overlay is present underneath the interface controller 344 and the interface controller 344 is not obstructed or covered by the overlay 345.

The front-end computer may generate and display the overlay 345 in response to determining that the selection of the interface controller 344 (e.g., none of the checkboxes are checked) would put the graph element 343 into an indeterminate state. The front-end computer may further prevent rendering of any updates to the user interface based on the selection. For example, none of the bar graphs in the graph element 343 may be removed even though they are not selected in the interface controller 344. In this example, the overlay 345 may not cover the interface controller 224 or the menu bar 341. The menu bar 341 may not be covered by the overlay 345 so that the user may still return to a home screen, save their work, or exit the application, for example.

In some embodiments, the user interface may include interface controllers both in the page (as shown in FIG. 2) and in a popup menu or window (as shown in FIG. 3). The overlay can be positioned differently depending on the configuration of the interface controller. For example, in embodiments where the interface is a webpage, the in-page interface controller may be positioned at a first z-index of a first stacking context while the popup interface controller may be positioned at a second z-index of a second stacking context. The "z-index" may refer to a CSS property that specifies the stack order of an element where an element with greater stack order is always in front of an element with a lower stack order (e.g., from the user's viewing perspective). The "stacking context" may refer to a three-dimensional conceptualization of elements along a z-axis relative to the user, who is assumed to be facing the viewport or the webpage. The z-index of interface elements within the same stacking context may set their stacking order.

In order to position the overlay differently depending on the position of the interface controller, the front-end computer (e.g., a software application or web browser of the front-end computer providing the user interface) may determine the configuration of the interface controller. The front-end computer may also determine one or more particular states of the control elements that would cause an indeterminate state as different controllers may have different sets of control elements. The front-end computer may also determine portions of the user interface that are outside of the interface controller as the position of the interface controller may be different. The front-end computer may then position the overlay beneath or around the interface controller. In addition, the front-end computer may also prevent queries from being generated and sent and prevent the user from interactions with portions of the interface covered by the interface controller. The process for generating the overlay is described in further detail below.

Figure 4:
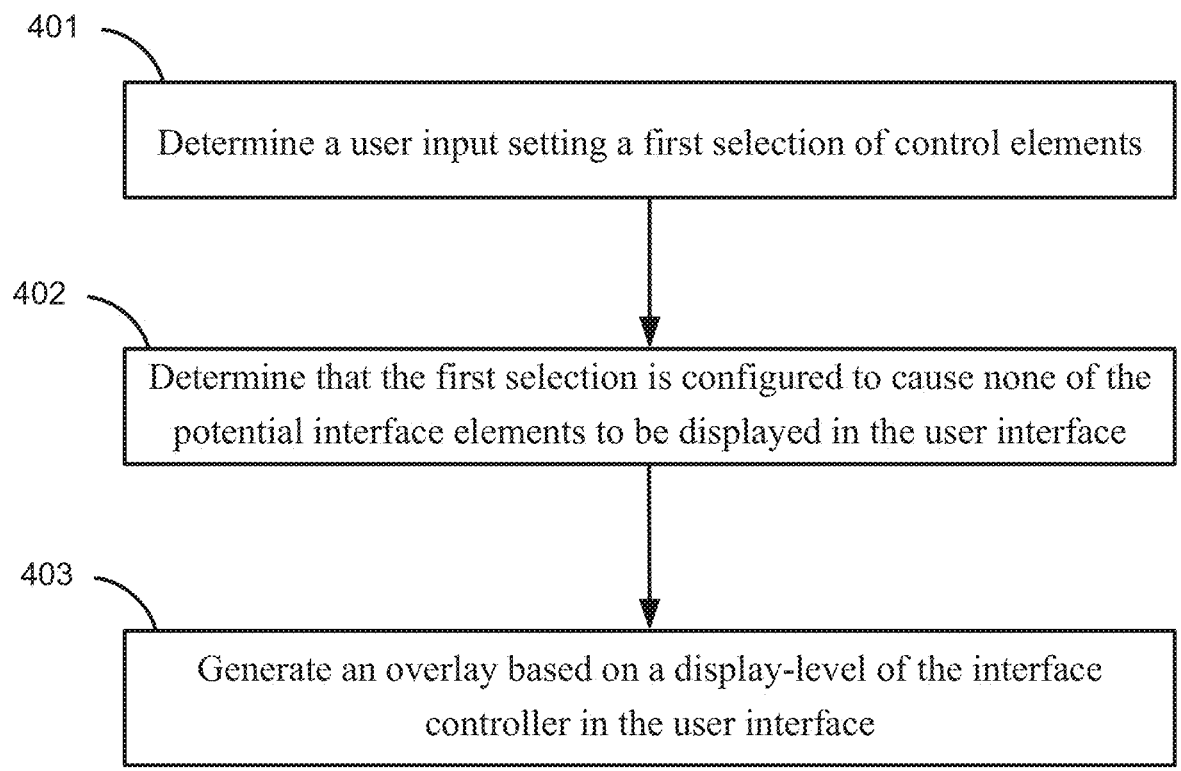
FIG. 4 shows a flowchart of a method for generating an overlay, according to an embodiment.

FIG. 4 shows a flowchart of a method for generating an overlay, according to an embodiment. The method of FIG. 4 may be performed by a front-end computer, as described herein.

At 401, the method includes determining a user input setting a first selection of control elements. The control elements may be checkboxes as described herein. The control elements may be part of an interface controller (e.g., a list of check boxes that may be selected to customize a user interface). The interface controller may be displayed in a user interface (e.g., a web page). Particular selections of the control elements may be configured to cause corresponding sets of potential interface elements to be displayed in a portion of the user interface. For example, particular selections of checkboxes in an interface controller may be configured to cause different categories of data to be presented in a bar graph as described above with respect to FIG. 2 and FIG. 3.

At 402, the method includes determining that the first selection of the control elements is configured to cause none of the potential interface elements to be displayed in the portion of the user interface. That is, the portion of the user interface may enter an indeterminate state. In some embodiments, the control elements of the interface controller include checkboxes. In some embodiments, the potential interface elements include charts or graphs. In some embodiments, the method further includes determining that none of the check-boxes are selected. In such embodiments, the determining that the selection of the control elements is configured to cause none of the potential interface elements to be displayed in the portion of the user interface may be based on the determining that none of the check-boxes are selected.

For example, the selection of the control elements may not include any checkboxes being checked as shown in the second user interface 210 of FIG. 2, which may cause none of the bars to be displayed in the bar graph of the graph element 223 (e.g., "Alcohol," "Carbonated Drinks," "Juices," and "Others," would not be displayed in the bar graph, leaving the graph empty). In this example, the bars for "Alcohol," "Carbonated Drinks," "Juices," and "Others" are "potential interface elements" that may be customized by selecting the corresponding checkboxes having the same label.

At 403, the method includes generating an overlay based on a display-level of the interface controller in the user interface. In some embodiments, the method further includes determining a position, a dimension, and the display-level of the interface controller from user interface configuration information. In some embodiments, the method further includes determining an overlay position, an overlay dimension, and an overlay display-level for the overlay based on the position, the dimension, and the display-level of the interface controller. In such embodiments, the overlay may be displayed in the user interface according to the overlay position, the overlay dimension, and the overlay display-level.

In some embodiments, the user interface configuration information includes a Cascading Style Sheet and the display-level of the interface controller is based on a z-index parameter in the Cascading Style Sheet, for example. In embodiments where the user interface is a web page, a display-level of the interface controller may a z-index property of a div including the control elements of the interface controller, for example. In such embodiments the display-level of the overlay may be a z-index property of one or more divs that the overlay is comprised of. In such embodiments, the z-index property of the overlay divs may have lower numerical values compared to the z-index property of the interface controller div such that the interface controller is stacked above the overlay (e.g., the overlay appears before the interface controller). In some embodiments, the overlay covers the portion of the user interface (e.g., the bar graph) and the overlay does not cover the interface controller.

In some embodiments the user interface further includes a second interface controller having second control elements configured to cause the corresponding sets of the potential interface elements to be displayed in the portion of the user interface. In such embodiments, the generating of the overlay may be further based on the second interface controller. For example, as shown in FIG. 2 and FIG. 3, the interface controller may be included in the page and it may also be included in a popup menu accessible by selecting an icon in a control menu bar.

In some embodiments the method can further include sending a first query a back-end server based on a previous selection of the control elements of the interface controller. For example, the first query may receive information on "Alcohol," "Carbonated Drinks," "Juices," and "Others," as shown in FIG. 2. In such embodiments, the method may further include displaying the overlay in the user interface instead of sending a second query to the based on the first selection of the control elements of the interface controller. For example, when an "all" checkbox is deselected, the overlay may be shown instead of sending a query and updating the user interface as shown in the second user interface 220 of FIG. 2. In such embodiments, the method may further include determining a third user input setting a third selection of the control elements of the interface controller. For example, the user may select one of the checkboxes (e.g., "Juices"). In such embodiments, the method may further include determining that the third selection of the control elements is configured to cause at least one of the potential interface elements to be displayed in the portion of the user interface (e.g., the bar graph would graph the value of "222.13" for "Juices" as shown in FIG. 3). In such embodiments, the method may further include sending a third query a back-end server based on the third selection of the control elements of the interface controller.

The generation of the overlay advantageous as the overlay may visually indicate to the user that they should select control elements (e.g., checkboxes) in the non-overlayed interface controller in order to make at least one of the potential user interface elements be displayed, thereby leaving the indeterminate state. Thus, the overlay improves the user experience because it indicates to the user that there is an issue with the selection of control elements in the interface controller without presenting a disruptive error message. The user experience is also improved because interface elements covered by the overlay may be paused, preventing jittering or flickering of the interface elements when numerous elements are selected or deselected (e.g., when selecting or deselecting an "all" checkbox). Furthermore, computing and networking resources may be reduced since queries are not sent and updates to the user interface are not made while the overlay is being displayed and the interface is paused.

Figure 5:
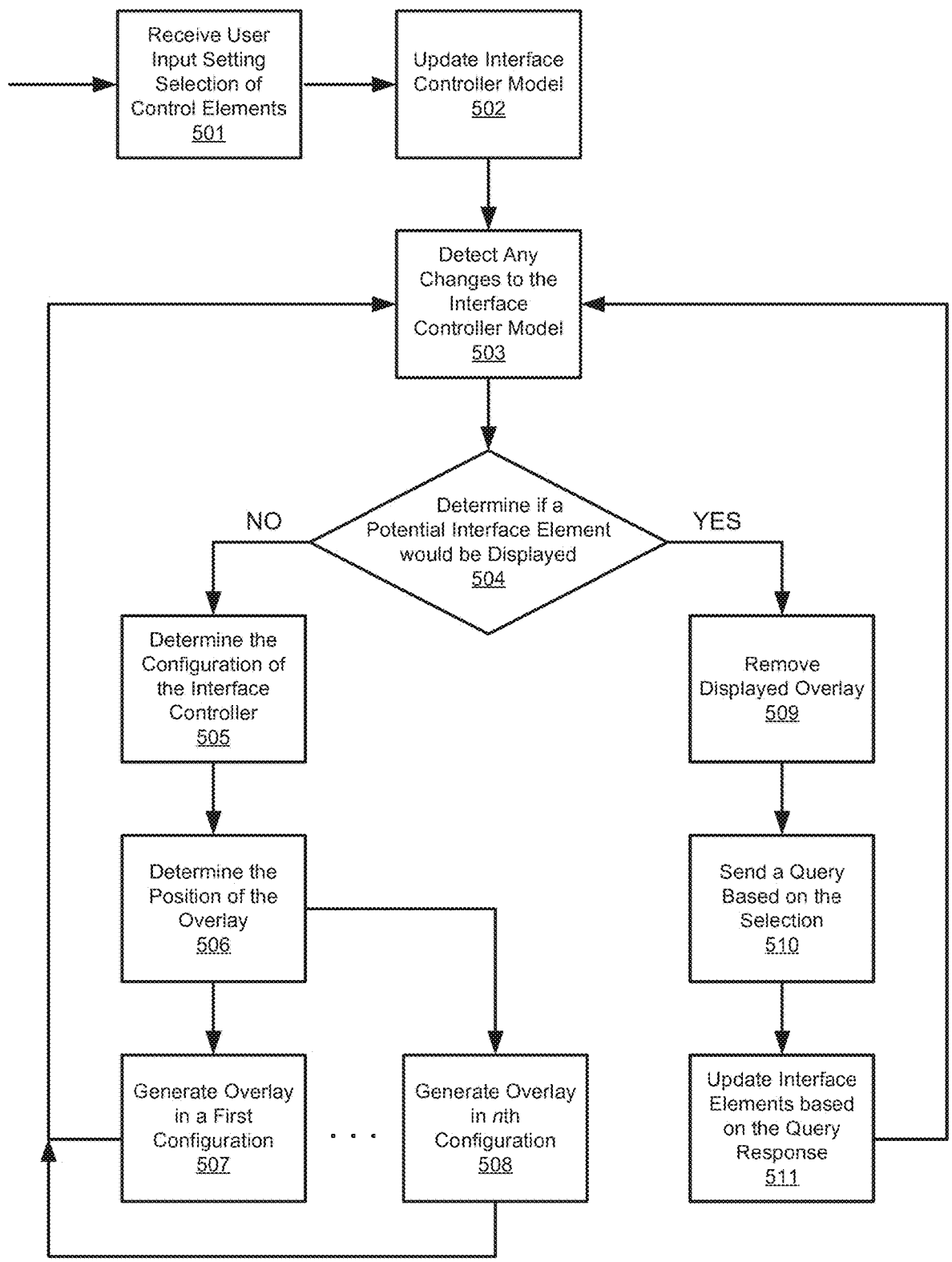
FIG. 5 shows a diagram of a process for updating user interface elements or displaying an overlay based on user input, according to an embodiment.

FIG. 5 shows a diagram of a process for updating user interface elements or displaying an overlay based on user input, according to an embodiment. This process may be performed by a front-end computer as described herein.

At 501, the process receives user input setting selection of control elements. For example, the user may select certain checkboxes as described here.

At 502, the process updates an interface controller model. The interface controller model may be a data model including parameters and configurations for configuring the user interface. In some embodiments, the interface controller model may be a JSON object.

At 503, the process detects any changes to the interface controller model. For example, the users selection at 501 may cause an update event at 502 and the process may listen for the update events that cause changes to the interface controller model, there by detecting any changes to the model.

At 504, the process determines if a potential interface element would displayed or not. If none of the potential interface elements that may be selected in the interface controller are selected, the decision is "NO" and the process proceeds to 505. If at least one of the potential interface elements are selected, the decision is "YES" and the process proceeds to 509.

At 505, the process determines the configuration of the interface controller. The configuration can be determined from a configuration file (e.g., CSS). The different configurations of the interface controller may be at presented in the user interface at different display-levels (e.g., at a different z-index)

At 506, the process determines the position of the overlay. The position of the overlay may be set based on the position of the interface controller such that the interface controller is displayed or stacked over the overlay (e.g., it is not covered by the overlay). In some embodiments, a numerical z-index value for the overlay may be less than a z-index value for the interface controller.

Depending on the configuration of the interface controller determined at 505 and the position of the overlay determined at 506, the process may generate and display the overlay in a first configuration 507, or some different configuration from among n different pre-determined configurations including an nth configuration 508.

After generating the overlay, the process may return to 503 and monitor for and detect any changes to the interface controller model.

Returning to 504, if at least one of the potential interface elements are selected, the decision is "YES" and the process proceeds to 509.

At 509, the process includes removing any displayed overlay (e.g., an overlay generated at 507 or 508). In some cases there may not be an overlay to be removed.

At 510, the process includes sending a query based on the selection to a back-end server. The query may request data to be displayed in the user interface as described herein.

At 511, the process includes updating the interface elements in the user interface based on the query response. For example, information can be graphs in a bar graph based on the information in the query response, as described herein.

Figure 6:
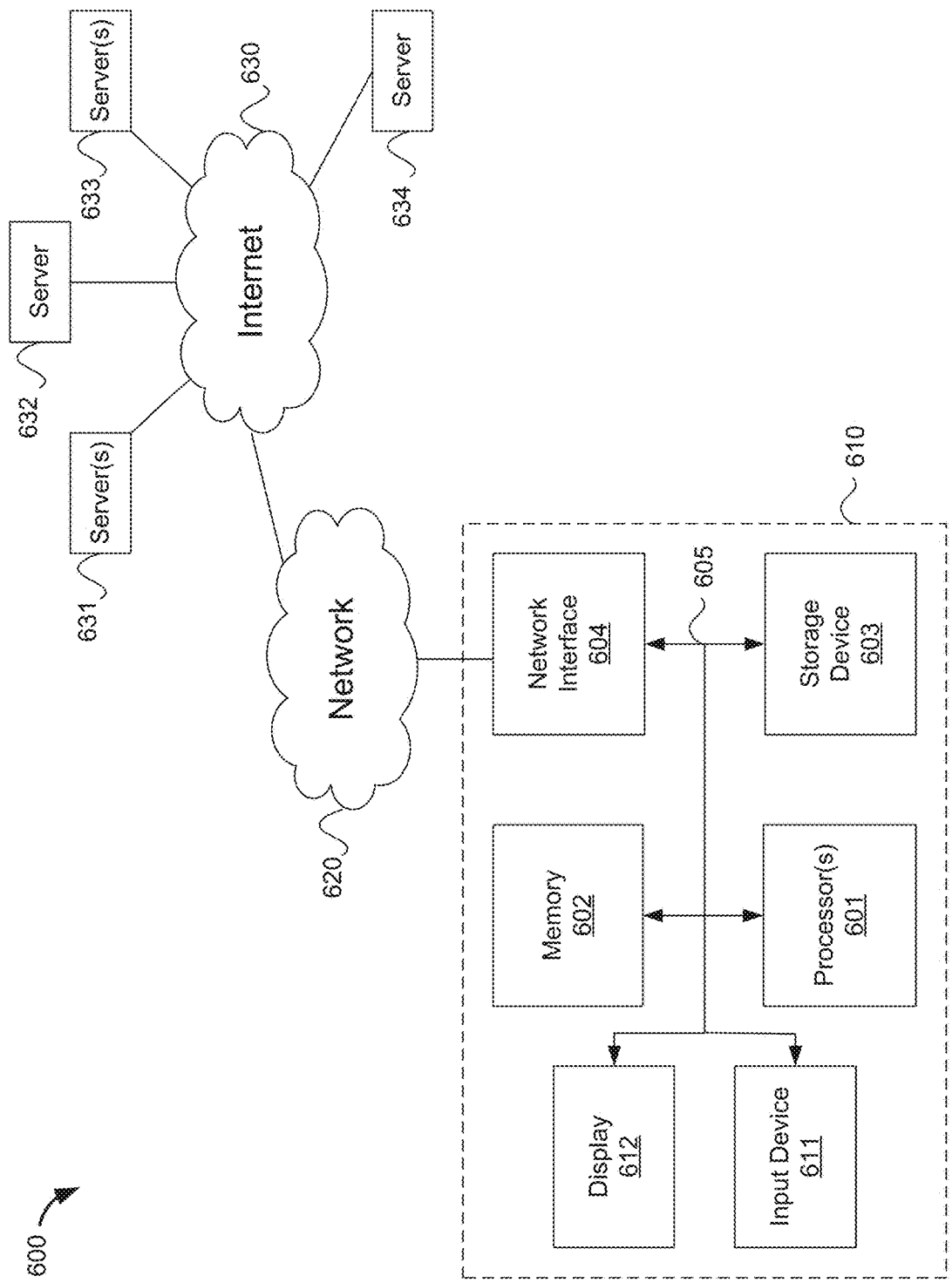
FIG. 6 shows a diagram of hardware of a special purpose computing machine for implementing systems and methods described herein.

The process of FIG. 6 is advantageous because it enables the overlay to be placed in various configurations to account for different positions of the interface controller. In addition, it enables the overlay to be removed once it is no longer needed (e.g., once the user has made a selection).

FIG. 6 shows a diagram of hardware of a special purpose computing machine for implementing systems and methods described herein. The following hardware description is merely one example. It is to be understood that a variety of computers topologies may be used to implement the above described techniques.

An example computer system 610 is illustrated in FIG. 6. Computer system 610 includes a bus 605 or other communication mechanism for communicating information, and one or more processor(s) 601 coupled with bus 605 for processing information. Computer system 610 also includes a memory 602 coupled to bus 605 for storing information and instructions to be executed by processor 601, including information and instructions for performing some of the techniques described above, for example. This memory may also be used for storing programs executed by processor(s) 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device and memory are both examples of non-transitory computer readable storage mediums.

Computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses, for example.

Computer system also includes a network interface 604 coupled with bus 605. Network interface 604 may provide two-way data communication between computer system 610 and a network 620. The network interface 604 may be a wireless or wired connection, for example. Computer system 610 can send and receive information through the network interface 604 across a local area network, an Intranet, a cellular network, or the Internet, for example. In the Internet example, a browser, for example, may access data and features on backend systems that may reside on multiple different hardware servers 631-634 across the network. The servers 631-634 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer-implemented method for interactively customizing a user interface, the method comprising:
   receiving, at an interface software processing module, one or more user inputs defining a selection of a plurality of user interface control elements to be added to the user interface;
   updating a user interface controller model based on the one or more user inputs defining the selection of the plurality of user interface control elements to be added to the user interface;
   based on updating the user interface controller model, detecting one or more changes caused by a user input setting a first selection of control elements of an interface controller in a user interface, particular selections of the control elements configured to cause corresponding sets of potential interface elements to be displayed in a portion of the user interface, wherein prior to the first selection a previous selection of the control elements caused one or more of the potential interface elements to be displayed in the portion of the user interface;
   determining that the first selection of the control elements is configured to cause none of the potential interface elements to be displayed in the portion of the user interface;
   in response to the determination that the first selection is configured to cause none of the potential interface elements to be displayed, generating an overlay positioned at a display-level lower than a display-level of the interface controller in the user interface; and
   in response to a determination that a second selection is configured to cause one or more existing user interface elements to be covered, pausing queries to the interface software processing module to prevent the existing user interface elements being updated while the overlay is being displayed.

2. The computer-implemented method of claim 1, wherein the overlay covers the portion of the user interface and the overlay does not cover the interface controller.

3. The computer-implemented method of claim 1, further comprising:
   determining a position, a dimension, and the display-level of the interface controller from user interface configuration information; and
   determining an overlay position, an overlay dimension, and an overlay display-level for the overlay based on the position, the dimension, and the display-level of the interface controller, wherein the overlay is displayed in the user interface according to the overlay position, the overlay dimension, and the overlay display-level.

4. The computer-implemented method of claim 3, wherein the user interface configuration information includes a Cascading Style Sheet, and wherein the display-level of the interface controller is based on a z-index parameter in the Cascading Style Sheet.

5. The computer-implemented method of claim 1, wherein the control elements of the interface controller include check-boxes, wherein the potential interface elements include charts or graphs, and wherein the method further comprises:
   determining that none of the check-boxes are selected, wherein the determining that the selection of the control elements would cause none of the potential interface elements to be displayed in the portion of the user interface is based on the determining that none of the check-boxes are selected.

6. The computer-implemented method of claim 1, wherein the user interface further includes a second interface controller having second control elements, wherein selections of the second control elements cause the corresponding sets of the potential interface elements to be displayed in the portion of the user interface, wherein the generating of the overlay is further based on the second interface controller.

7. The computer-implemented method of claim 1, further comprising:
   sending a first query to a back-end server based on the previous selection of the control elements of the interface controller, the previous selection made prior to the first selection;
   displaying the overlay in the user interface instead of sending a second query to the back-end server based on the first selection of the control elements of the interface controller;
   determining a third user input setting a third selection of the control elements of the interface controller;
   determining that the third selection of the control elements would cause at least one of the potential interface elements to be displayed in the portion of the user interface; and
   sending a third query to the back-end server based on the third selection of the control elements of the interface controller.

8. A non-transitory machine-readable medium storing a program executable by at least one processing unit of a device, the program comprising sets of instructions for customizing a user interface, the instructions comprising:
   receiving, at an interface software processing module, one or more user inputs defining a selection of a plurality of user interface control elements to be added to the user interface;
   updating a user interface controller model based on the one or more user inputs defining the selection of the plurality of user interface control elements to be added to the user interface;
   based on updating the user interface controller model, detecting one or more changes caused by a user input setting a first selection of control elements of an interface controller in the user interface, particular selections of the control elements configured to cause corresponding sets of potential interface elements to be displayed in a portion of the user interface, wherein prior to the first selection a previous selection of the control elements caused one or more of the potential interface elements to be displayed in the portion of the user interface;

determining that the first selection of the control elements is configured to cause none of the potential interface elements to be displayed in the portion of the user interface;

in response to the determination that the first selection is configured to cause none of the potential interface elements to be displayed, generating an overlay positioned at a display-level lower than a display-level of the interface controller in the user interface; and in response to a determination that a second selection is configured to cause one or more existing user interface elements to be covered, pausing queries to the interface software processing module to prevent the existing user interface elements being updated while the overlay is being displayed.

9. The non-transitory machine-readable medium of claim 8, wherein the overlay covers the portion of the user interface and the overlay does not cover the interface controller.

10. The non-transitory machine-readable medium of claim 8, wherein the program further comprises sets of instructions for:

determining a position, a dimension, and the display-level of the interface controller from user interface configuration information; and determining an overlay position, an overlay dimension, and an overlay display-level for the overlay based on the position, the dimension, and the display-level of the interface controller, wherein the overlay is displayed in the user interface according to the overlay position, the overlay dimension, and the overlay display-level.

11. The non-transitory machine-readable medium of claim 10, wherein the user interface configuration information includes a Cascading Style Sheet, and wherein the display-level of the interface controller is based on a z-index parameter in the Cascading Style Sheet.

12. The non-transitory machine-readable medium of claim 8, wherein the control elements of the interface controller include check-boxes, wherein the potential interface elements include charts or graphs, and wherein the program further comprises sets of instructions for:

determining that none of the check-boxes are selected, wherein the determining that the selection of the control elements would cause none of the potential interface elements to be displayed in the portion of the user interface is based on the determining that none of the check-boxes are selected.

13. The non-transitory machine-readable medium of claim 8, wherein the user interface further includes a second interface controller having second control elements, wherein selections of the second control elements cause the corresponding sets of the potential interface elements to be displayed in the portion of the user interface, wherein the generating of the overlay is further based on the second interface controller.

14. The non-transitory machine-readable medium of claim 8, wherein the program further comprises sets of instructions for:

sending a first query to a back-end server based on the previous selection of the control elements of the interface controller;

displaying the overlay in the user interface instead of sending a second query to the back-end server based on the first selection of the control elements of the interface controller;

determining a third user input setting a third selection of the control elements of the interface controller;

determining that the third selection of the control elements would cause at least one of the potential interface elements to be displayed in the portion of the user interface; and sending a third query to the back-end server based on the third selection of the control elements of the interface controller.

15. A computer system for customizing a user interface, the computer system comprising:

one or more processors;

memory; and computer program code comprising instructions, executable on the one or more processors, the computer program code configured to:

receive, at an interface software processing module, one or more user inputs defining a selection of a plurality of user interface control elements to be added to the user interface;

update a user interface controller model based on the one or more user inputs defining the selection of the plurality of user interface control elements to be added to the user interface;

determine a user input setting a first selection of control elements of an interface controller in a user interface, particular selections of the control elements configured to cause corresponding sets of potential interface elements to be displayed in a portion of the user interface, wherein prior to the first selection a previous selection of the control elements caused one or more of the potential interface elements to be displayed in the portion of the user interface;

based on updating the user interface controller model, detect one or more changes caused by that the first selection of the control elements is configured to cause none of the potential interface elements to be displayed in the portion of the user interface;

in response to the determination that the first selection is configured to cause none of the potential interface elements to be displayed, generate an overlay positioned at a display-level lower than a display-level of the interface controller in the user interface; and in response to a determination that a second selection is configured to cause one or more existing user interface elements to be covered, pause queries to the interface software processing module to prevent the existing user interface elements being updated while the overlay is being displayed.

16. The computer system of claim 15, wherein the overlay covers the portion of the user interface and the overlay does not cover the interface controller.

17. The computer system of claim 15, wherein the computer program code further comprises instructions to:

determine a position, a dimension, and the display-level of the interface controller from user interface configuration information, and determine an overlay position, an overlay dimension, and an overlay display-level for the overlay based on the position, the dimension, and the display-level of the interface controller, wherein the overlay is displayed in the user interface according to the overlay position, the overlay dimension, and the overlay display-level.

18. The computer system of claim 17, wherein the user interface configuration information includes a Cascading Style Sheet, and wherein the display-level of the interface controller is based on a z-indeX parameter in the Cascading Style Sheet.

19. The computer system of claim 15, wherein the control elements of the interface controller include check-boxes, wherein the potential interface elements include charts or graphs, and wherein the computer program code further comprises instructions to:
  determine that none of the check-boxes are selected, wherein the determination that the selection of the control elements would cause none of the potential interface elements to be displayed in the portion of the user interface is based on the determining that none of the check-boxes are selected.

20. The computer system of claim 15, wherein the user interface further includes a second interface controller having second control elements, wherein selections of the second control elements cause the corresponding sets of the potential interface elements to be displayed in the portion of the user interface, wherein the generating of the overlay is further based on the second interface controller, and wherein the computer program code further comprises instructions to:

send a first query to a back-end server based on the previous selection of the control elements of the interface controller, display the overlay in the user interface instead of sending a second query to the back-end server based on the first selection of the control elements of the interface controller, determine a third user input setting a third selection of the control elements of the interface controller, determine that the third selection of the control elements would cause at least one of the potential interface elements to be displayed in the portion of the user interface, and send a third query to the back-end server based on the third selection of the control elements of the interface controller.

* * * * *